(12) United States Patent
Kawada

(10) Patent No.: US 7,684,693 B2
(45) Date of Patent: Mar. 23, 2010

(54) IMAGING APPARATUS AND IMAGING SYSTEM

(75) Inventor: Kazutoshi Kawada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/437,071

(22) Filed: May 7, 2009

(65) Prior Publication Data

US 2009/0214197 A1 Aug. 27, 2009

Related U.S. Application Data

(62) Division of application No. 11/417,844, filed on May 4, 2006, now Pat. No. 7,546,033.

(30) Foreign Application Priority Data

May 11, 2005 (JP) .............................. 2005-138539

(51) Int. Cl.
*G03B 7/26* (2006.01)
*H04N 5/225* (2006.01)

(52) U.S. Cl. ....................................... 396/303; 348/372

(58) Field of Classification Search ................. 396/301, 396/303; 348/372
See application file for complete search history.

(56) References Cited

U.S. PATENT DOCUMENTS

| 5,963,255 | A | * | 10/1999 | Anderson et al. ........... 348/372 |
| 6,448,899 | B1 | | 9/2002 | Thompson |
| 6,473,608 | B1 | | 10/2002 | Lehr et al. |
| 6,486,916 | B1 | * | 11/2002 | Stevens ....................... 348/372 |
| 6,710,809 | B1 | * | 3/2004 | Niikawa ...................... 348/372 |
| 7,298,416 | B2 | * | 11/2007 | Uryu ........................... 348/372 |
| 7,324,153 | B2 | * | 1/2008 | Koeda et al. ................. 348/372 |
| 2005/0050371 | A1 | * | 3/2005 | Ono ............................. 713/300 |
| 2005/0062879 | A1 | * | 3/2005 | Ohsuga ....................... 348/372 |
| 2006/0017840 | A1 | * | 1/2006 | Sawachi ...................... 348/372 |

FOREIGN PATENT DOCUMENTS

KR 2003-0066498 A 8/2003

* cited by examiner

*Primary Examiner*—Rodney E Fuller
(74) *Attorney, Agent, or Firm*—Canon U.S.A., Inc. I.P. Division

(57) ABSTRACT

An imaging apparatus includes an imaging unit configured to convert an object image formed by an imaging optical system into an electrical signal, a power supply unit capable of being supplied with power from first and second power supply systems, and a control unit configured to cause the imaging unit to operate in different control modes according to whether power is supplied from the first power supply system or the second power supply system.

8 Claims, 9 Drawing Sheets

FIG.3

| CONTROL MODE TYPE | CONTROL METHOD |
|---|---|
| FIRST CONTROL MODE | PAN SPEED: MAX 1000PPS<br>TILT SPEED: MAX 1000PPS<br>ZOOM SPEED: MAX 500PPS<br>INFRARED LIGHTING: 5W<br>SIMULTANEOUS OPERATION:<br>    PAN/TILT/ZOOM/INFRARED LIGHTING<br>    - POSSIBLE |
| SECOND CONTROL MODE | PAN SPEED: MAX 300PPS<br>TILT SPEED: MAX 300PPS<br>ZOOM SPEED: MAX 200PPS<br>INFRARED LIGHTING: 1W<br>NON-SIMULTANEOUS OPERATION:<br>    PAN ONLY/TILT ONLY/ZOOM ONLY/<br>    IR LIGHTING ONLY |

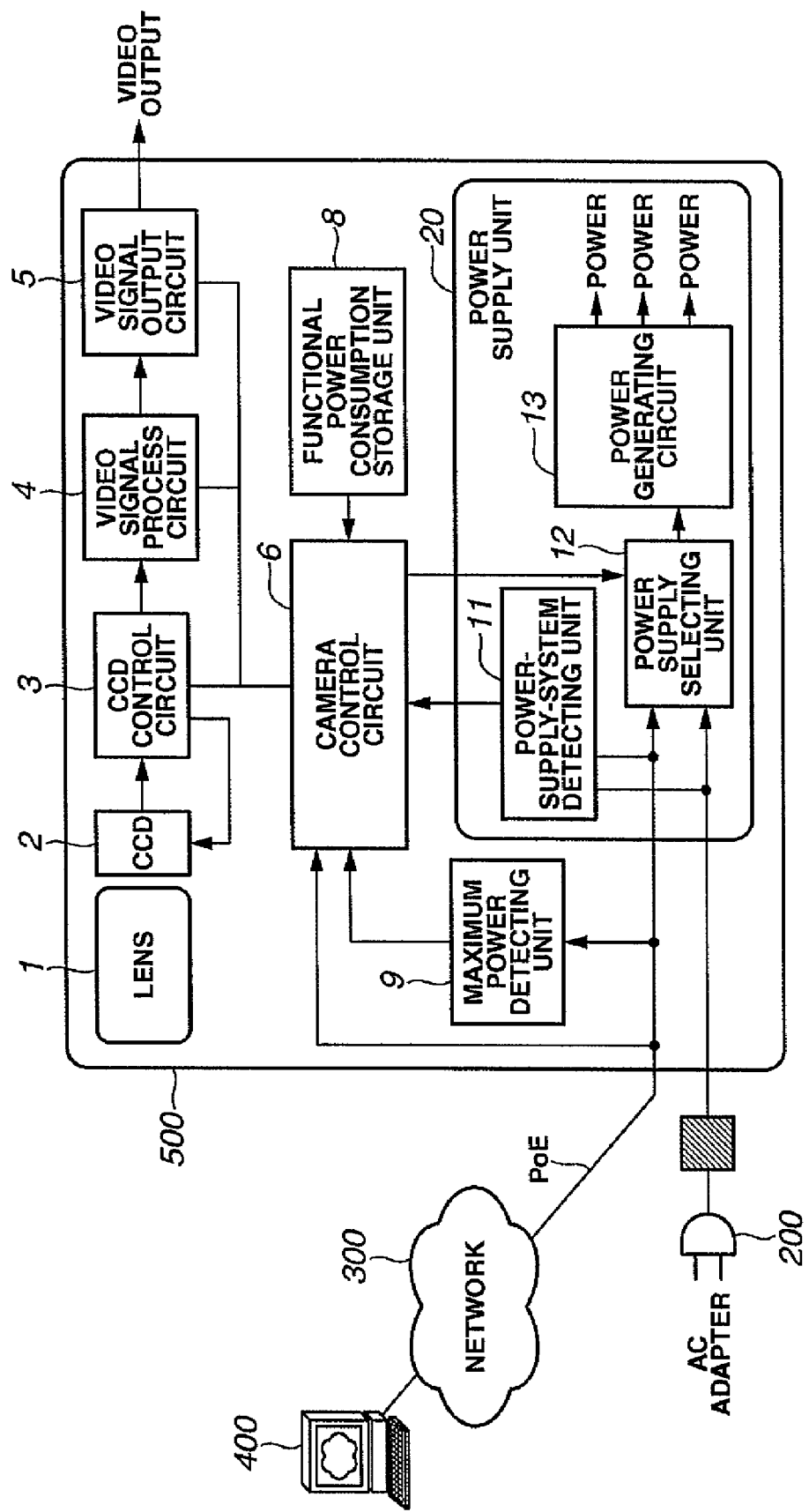

IMAGING APPARATUS AND IMAGING SYSTEM

CROSS REFERENCE TO RELATED APPLICATIONS

The present application is a divisional of U.S. patent application Ser. No. 11/417,844, filed May 4, 2006, entitled "IMAGING APPARATUS AND IMAGING SYSTEM", the content of which is expressly incorporated by reference herein in its entirety. Further, the present application claims priority from Japanese Patent Application No. 2005-138539, filed May 11, 2005, which is also hereby incorporated by reference herein in its entirety.

BACKGROUND OF THE INVENTION

1. Field of the Invention

The present invention relates to an imaging apparatus and an imaging system which are configured to be supplied with electric power through a signal communication unit, such as a signal cable using PoE (Power over Ethernet).

2. Description of the Related Art

Conventional monitoring cameras include cameras called CCTV (Closed-Circuit TV). The CCTV camera outputs a video signal of NTSC format, for example, over a video cable. The video signal is recorded by a time-lapse recorder and is displayed on a monitor for surveillance. In addition, cameras configured to be supplied with electric power through a video cable, so-called one-cable power supply system cameras, have been put into practical use.

In recent years, the use of monitoring cameras via networks has become prevalent. Surveillance with monitoring cameras via networks facilitates linking up with a security system, such as an entrance access security system, for example. Therefore, monitoring systems have become far more convenient today than ever before.

In the field of networks, a system has been developed which can supply electric power to cameras using PoE via a LAN cable. As a result, cameras can be driven without the need for an external power supply located near the camera. In particular, monitoring cameras sometimes need to be installed outdoors even if there is no external power supply. The one-cable power-supply system not only simplifies wiring, for example, but also obviates installation cost of an external power supply. Therefore, the one-cable power supply system can meet the market demand.

Meanwhile, recent monitoring cameras are equipped with diverse functions. Some monitoring cameras are equipped with AF (Auto Focus), power zoom, and pan and tilt driving functions.

The upper limit in the standards for power consumption of external devices in PoE is 12.95 W. From a practical point of view, however, the upper limit is 10 W or so. Power consumption in cameras includes, as typical examples, 2.5 W for video output, 2 W for video and signal transmission, 0.7 W for focusing, 0.8 W for zoom, 3 W for pan, 3 W for tilt, and 0.7 W for IR (infrared) cut filter switching. If all of those functions are driven at the same time, a total of about 13 W is required. Incidentally, so far, there have been no cameras using PoE and equipped with pan and tilt functions, and, therefore, such a problem as mentioned above has not been recognized.

In a camera discussed in Japanese Patent Application Laid-Open No. 2002-131806, electric power is supplied through a USB (Universal Serial Bus) cable to enable pan and tilt functions. However, that camera is not equipped with AF or zoom functions. Moreover, an image is distorted and picture quality is sacrificed as a result of reducing power consumption as much as possible.

In Japanese Patent Application Laid-Open No. 08-279952, a description is made of pan and tilt driving functions. However, only a camera platform unit is disclosed, and no mention is made of video output and so on.

A multifunction camera includes motors to drive various functions and, therefore, requires a large amount of electric power. However, as for monitoring cameras, power supply systems differ with installation environments. For example, in some cases, a simplified power supply system using PoE can be installed. In other cases, a dedicated AC adapter can be used. In the former situation, the power supply capacity is relatively small. In the latter, the power supply capacity is more than what is required, so that the operating performance of a camera can be utilized to the maximum. As has been described, since power supply environments are of great variety, there has been no camera that can meet diverse environments flexibly.

SUMMARY OF THE INVENTION

The present invention is directed to an imaging apparatus in no way inferior in function and picture quality to conventional imaging apparatuses which are supplied with electric power in the one-cable power supply system using PoE.

The present invention is also directed to enabling a maximum camera performance regardless of whether supplied power is sufficient or not.

In one aspect of the present invention, an imaging apparatus includes an imaging unit configured to convert an object image formed by an imaging optical system into an electrical signal, a power supply unit capable of being supplied with power from first and second power supply systems, and a control unit configured to cause the imaging unit to operate in different control modes according to whether power is supplied from the first power supply system or the second power supply system.

In an exemplary embodiment, the imaging apparatus further includes a power supply system detecting unit configured to detect one of the first and second power supply systems, and the control unit sets one of the control modes based on a detection result by the power supply system detecting unit. The power supply system detecting unit includes, for example, a switch configured to be turned on and off in response to installing or removing a plug of a dedicated AC adapter to or from a power outlet, or a device configured to detect an ON/OFF state of an AC power supply.

In another aspect of the present invention, an imaging apparatus includes a maximum power detecting unit configured to detect information about maximum power capable of being supplied from a power supply system, a power consumption information storage unit configured to store power consumption information indicating power consumption of given functions of the imaging apparatus, and a control unit configured to select functions to be contemporaneously executed based on the power consumption information corresponding to the functions stored in the power consumption information storage unit.

According to the present invention, a method of controlling the imaging apparatus is switched according to a characteristic of a power supply supplying power to the imaging apparatus. Accordingly, a maximum performance of the imaging apparatus can be attained within the limits of power supply capacity.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing examples of camera control modes in the imaging apparatus shown in FIG. 1.

FIG. 4 is a block diagram schematically showing a configuration of an imaging apparatus according to a second embodiment of the present invention.

DETAILED DESCRIPTION OF THE EMBODIMENTS

Exemplary embodiments of the invention will be described in detail below with reference to the drawings.

First Embodiment

Figure 1:
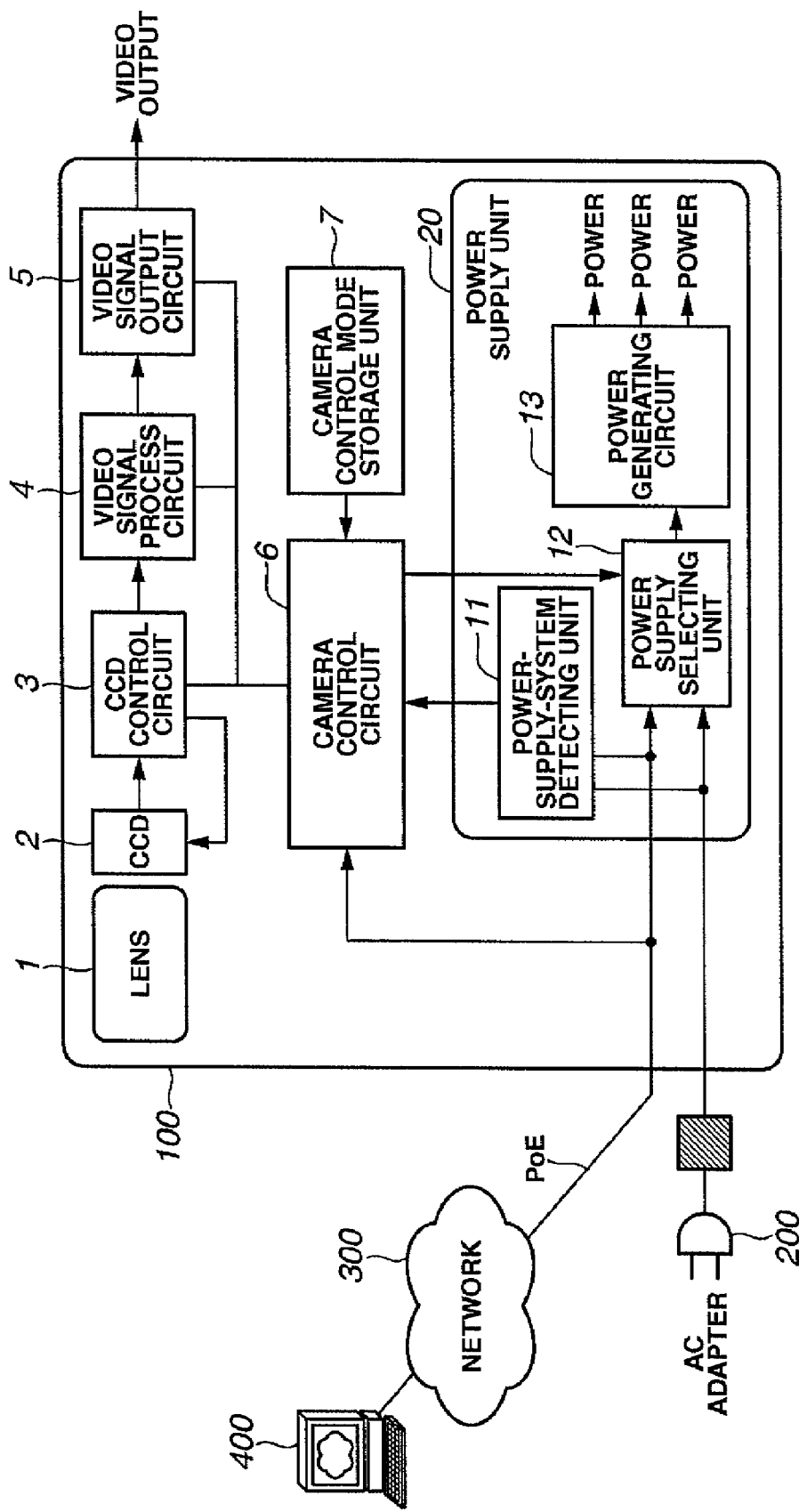
FIG. 1 is a block diagram schematically showing a configuration of an imaging apparatus according to a first embodiment of the present invention.

FIG. 1 is a block diagram schematically showing a configuration of a camera (imaging apparatus) 100 according to a first embodiment of the present invention.

In FIG. 1, an object image formed by an imaging lens 1 is converted into an electrical signal by a charge-coupled device (CCD) 2. The electrical signal is passed through a CCD control circuit 3, a video signal process circuit 4, and a video signal output circuit 5, and is then output as a video signal from the camera 100 to an external device (not shown). The imaging lens 1 images light from an object (not shown) to form an object image on the surface of the CCD 2. The camera 100 is equipped with a diaphragm mechanism, a zoom lens mechanism, a focus lens mechanism, etc., which are not shown.

An object image formed on the surface of the CCD 2 is converted into an electrical signal by a photoelectric conversion function of the CCD 2. Subsequently, the electrical signal is subjected to a series of video signal processes, such as camera image information analysis, a color process, a gamma process, and an effect process, at the video signal process circuit 4. The electrical signal that has undergone the video signal process is converted into a video signal format, and is then output by the video signal output circuit 5.

A camera control circuit 6 controls the diaphragm mechanism, the zoom lens mechanism, and the focus mechanism (not shown). Moreover, the camera control circuit 6 controls the whole camera 100 by issuing, for example, a control command to the CCD control circuit 3, a video process command to the video signal process circuit 4, and a command to the video signal output circuit 5 for video format conversion. A camera control mode storage unit 7 stores optimum camera control modes corresponding to amounts of electric power supplied by at least two power supply systems. The camera control mode storage unit 7 can provide information about each of the stored camera control modes in response to a request from the camera control circuit 6.

A power supply unit 20 includes a power-supply-system detecting unit 11. The power-supply-system detecting unit 11 detects a power supply condition of the camera 100. The power-supply-system detecting unit 11 notifies a result of detection to the camera control circuit 6.

The camera control circuit 6 makes a determination in selecting an optimum power supply system based on power supply system information obtained from the power-supply-system detecting unit 11. Then, the camera control circuit 6 issues a select command to a power supply selecting unit 12. In response to the select command from the camera control unit 12, the power supply selecting unit 12 selects one power supply system from among at least two power supply systems. A power generating circuit 13 converts power from a power supply system selected by the power supply selecting unit 12 to voltage values required for the camera 100 and supplies the voltage values to various portions of the camera 100.

The power supply systems include, for example, a power supply system I from an AC adapter 200 and a one-cable power supply system II from a network or information communication cable 300. The power supply system I from the AC adapter 200 is a power supply system which can supply sufficient power required to perform the camera functions at a maximum. On the other hand, the one-cable power supply system II from the network or information communication cable 300 is a power supply system that provides power less than that of the power supply system I and hence insufficient to perform the camera functions at a maximum. While the upper limit in the standards for supply electric energy in PoE is 12.95 W, as described above, the maximum power consumption of the camera 100 is 13 W.

In the above-described configuration, the camera control circuit 6 changes over between at least two control modes based on information from the power-supply-system detecting unit 11.

Figure 2:
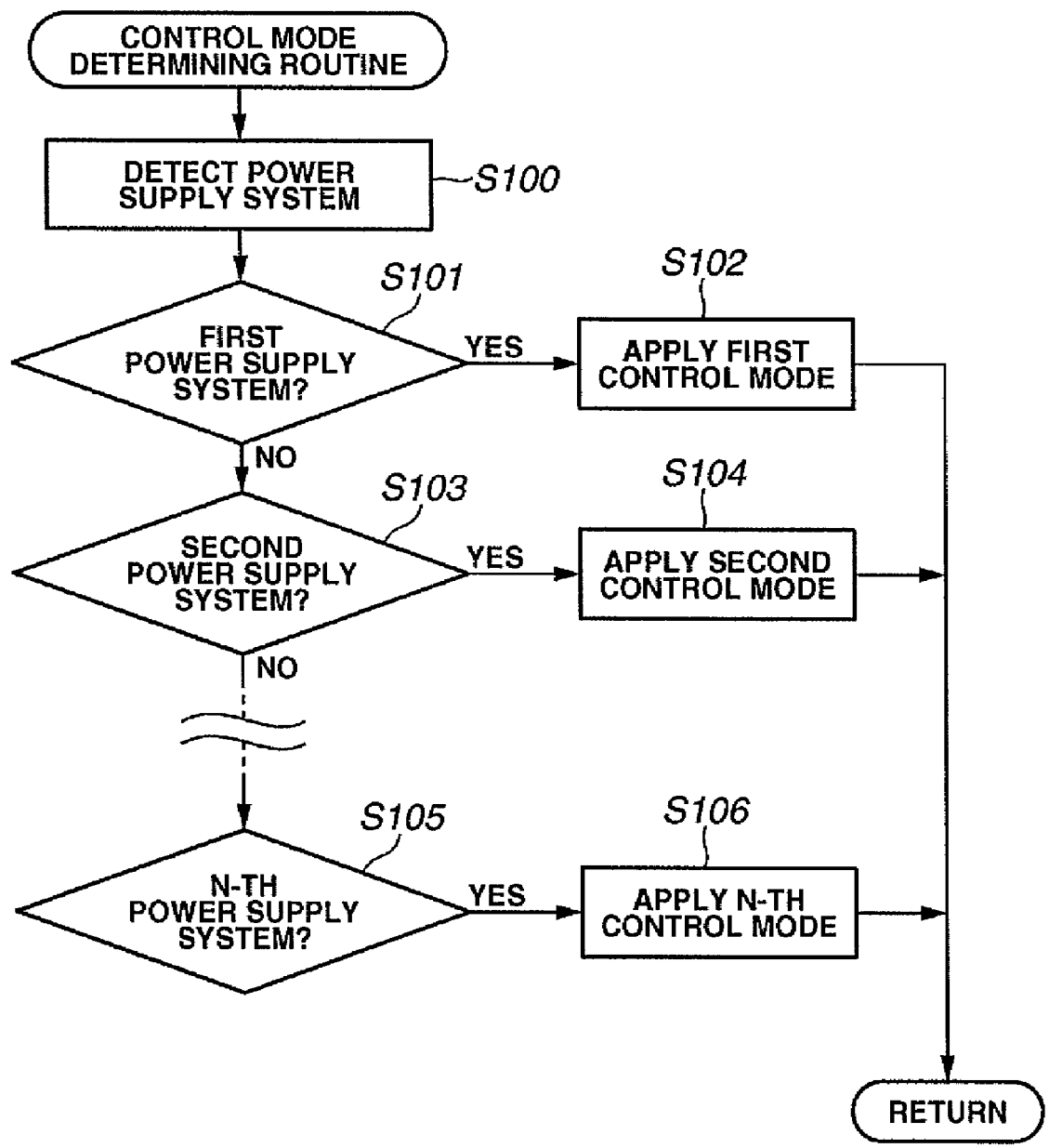
FIG. 2 is a flowchart showing a process of controlling an operation of the imaging apparatus shown in FIG. 1.

Referring to a flowchart of FIG. 2, an operation of applying an optimum camera control mode based on a result of detection of a power supply system in the camera 100 shown in FIG. 1 is described below.

In step S100, the camera control circuit 6 detects a power supply system. Then, on the basis of detection results on power supply systems, a determination is made in the order of power supply systems which can enable the camera functions at higher performance.

In step S101, the camera control circuit 6 determines whether a first power supply system is set.

If the first power supply system is set, in step S102, the camera circuit 6 applies a first control mode. When a control mode to be applied is determined, the camera control circuit 6 refers to information on control modes and control methods corresponding thereto stored in the camera control mode storage unit 7. Here, the camera control circuit 6 applies a control method which corresponds to the first control mode. Based on this information, the camera control circuit 6 controls the individual functions of the camera 100.

On the other hand, if it is determined in step S101 that the first power supply system is not set, in step S103, the camera control circuit 6 determines whether a second power supply system is set. Then, determinations are made sequentially in a similar way as the case of application of the first power supply system, and a camera control mode is applied which corresponds to a result of detection of every power supply system (step S104, . . . , S105, S106).

FIG. 3 is a table showing information about control methods which correspond to the respective camera control modes stored in the camera control mode storage unit 7.

By way of illustrative example, a description will be made of camera control modes in the table in FIG. 3.

In the table, the first control mode is a control mode that enables the camera to function with higher performance than in the second control mode. Looking at the functions described in the control method column, it can be found that the first control mode provides higher performance in terms of pan speed, tilt speed, zoom speed, infrared lighting, and allows simultaneous operation of a plurality of functions. More specifically, the speed in pan, tilt and zoom is higher in the first control mode than in the second control mode, and infrared lighting is brighter in the first control mode. Furthermore, in the first control mode, simultaneous operation of pan, tilt, zoom, and infrared lighting is possible. On the other hand, in the second control mode, pan, tilt, zoom and infrared lighting can be operated only independently of each other. Thus, the second control mode restrains the performance of camera functions as compared to the first control mode. However, with this restraint of the performance, the respective camera functions can be used within a limited range of electric power.

Meanwhile, in the table of FIG. 3, there is no difference in the AF (auto-focus) function and the AE (automatic exposure) function between the first control mode and the second control mode. However, it is possible to make some distinction as in the other functions, if necessary, for example, when the maximum supply power of the second power supply system is insufficient even if the performance is limited as shown in FIG. 3.

Note that the first power supply system is used in preference to the second to N-th power supply systems. The order of priority among those supply systems can be optimized from the viewpoint of the ease of power supply wiring in the camera installation environment, the magnitude of electric power that can be supplied, and the realizability of the camera functions.

As described, on the basis of information from the power-supply-system detecting unit 11, a control mode corresponding to a power supply system which is set for the camera 100 is selected and applied from among at least two camera control modes. Accordingly, the camera performance can be maximized within the limits of a power supply condition.

Second Embodiment

FIG. 4 is a block diagram schematically showing a configuration of an imaging apparatus (camera) 500 according to a second embodiment of the present invention.

The camera 500 in FIG. 4 includes a functional power consumption storage unit 8 and a maximum power detecting unit 9 instead of the camera control mode storage unit 7 included in the camera 100 in the first embodiment. In FIG. 4, elements similar to those shown in FIG. 1 are designated by the same reference numerals.

In FIG. 4, the functional power consumption storage unit 8 stores therein power consumption information corresponding to each function, indicating power consumption of each function of the camera 500. The functional power consumption storage unit 8 can provide stored power consumption information corresponding to each function in response to a request from the camera control circuit 6. The maximum power detecting unit 9 is configured to detect maximum power that can be supplied from the power supply system II and to notify a detection result to the camera control circuit 6.

More specifically, the maximum power detecting unit 9 is configured to detect available power of the power supply system II when power is supplied from the one-cable power supply system, i.e., through the network or information communication cable 300. The maximum power detecting unit 9 can be implemented in a form that information about available electric power is transmitted from outside of the camera via information communication through the network or information communication cable 300, or in a form that maximum power information is transmitted as power supply current or voltage from a power supply system.

With the configuration described above, the camera functions can be controlled adequately based on power consumption information corresponding to each function stored in the functional power consumption storage unit 8 and maximum power information of a power supply system detected by the maximum power detecting unit 9.

Figure 5:
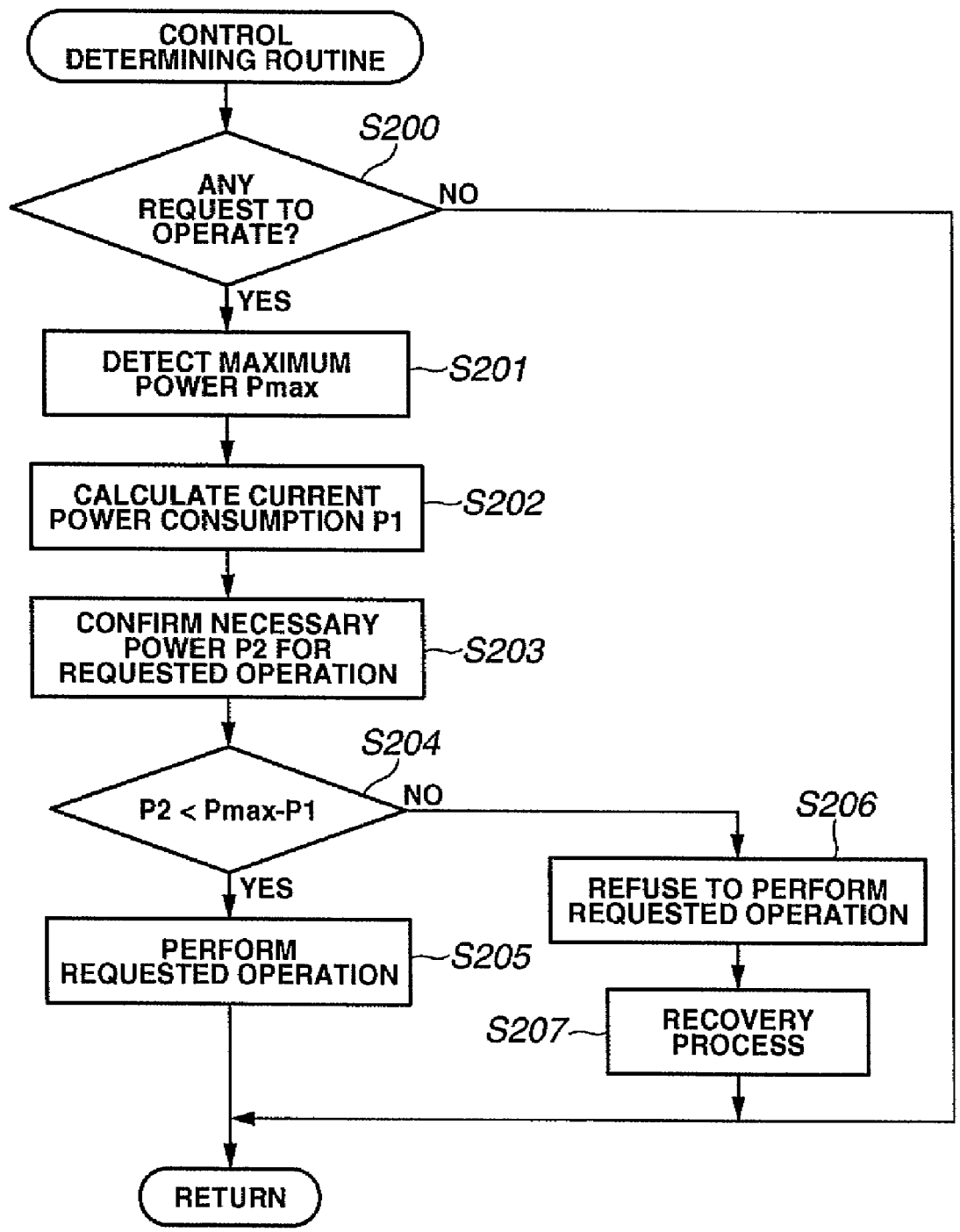
FIG. 5 is a flowchart showing a process of controlling an operation of the imaging apparatus shown in FIG. 4.

Referring to the flowchart of FIG. 5, a camera control operation based on power consumption information corresponding to each function stored in the functional power consumption storage unit 8 and maximum power information of a power supply system detected by the maximum power detecting unit 9 is described below.

In step S200, the camera control circuit 6 determines whether a request to operate the camera has been generated.

If there is a request to operate the camera, in step S201, the camera control circuit 6 detects maximum power Pmax detected by the maximum power detecting unit 9.

In step S202, the camera control circuit 6 calculates current power consumption P1 by integrating the power consumption information corresponding to each function stored in the storage unit 8.

In step S203, the camera control circuit 6 calculates power P2 required to execute a function, for which the camera operation request has been issued, based on the power consumption information corresponding to each function.

In step S204, the camera control circuit 6 determines whether the power P2 required to execute the function, for which the camera operation request has been issued, is smaller than the current surplus power (Pmax−P1) which is usable within such a range that the camera's total power consumption does not exceed the maximum power Pmax. If the power P2 is smaller than the current surplus power (Pmax−P1), in step S205, the camera control circuit 6 executes an operation requested by the camera operation request (hereafter referred to as a "requested operation"). On the other hand, if the power P2 is not smaller than the current surplus power (Pmax−P1), in step S206, the camera control circuit 6 refuses to perform the requested operation.

In step S207, the camera control circuit 6 performs a recovery process for the requested operation.

Figure 6:
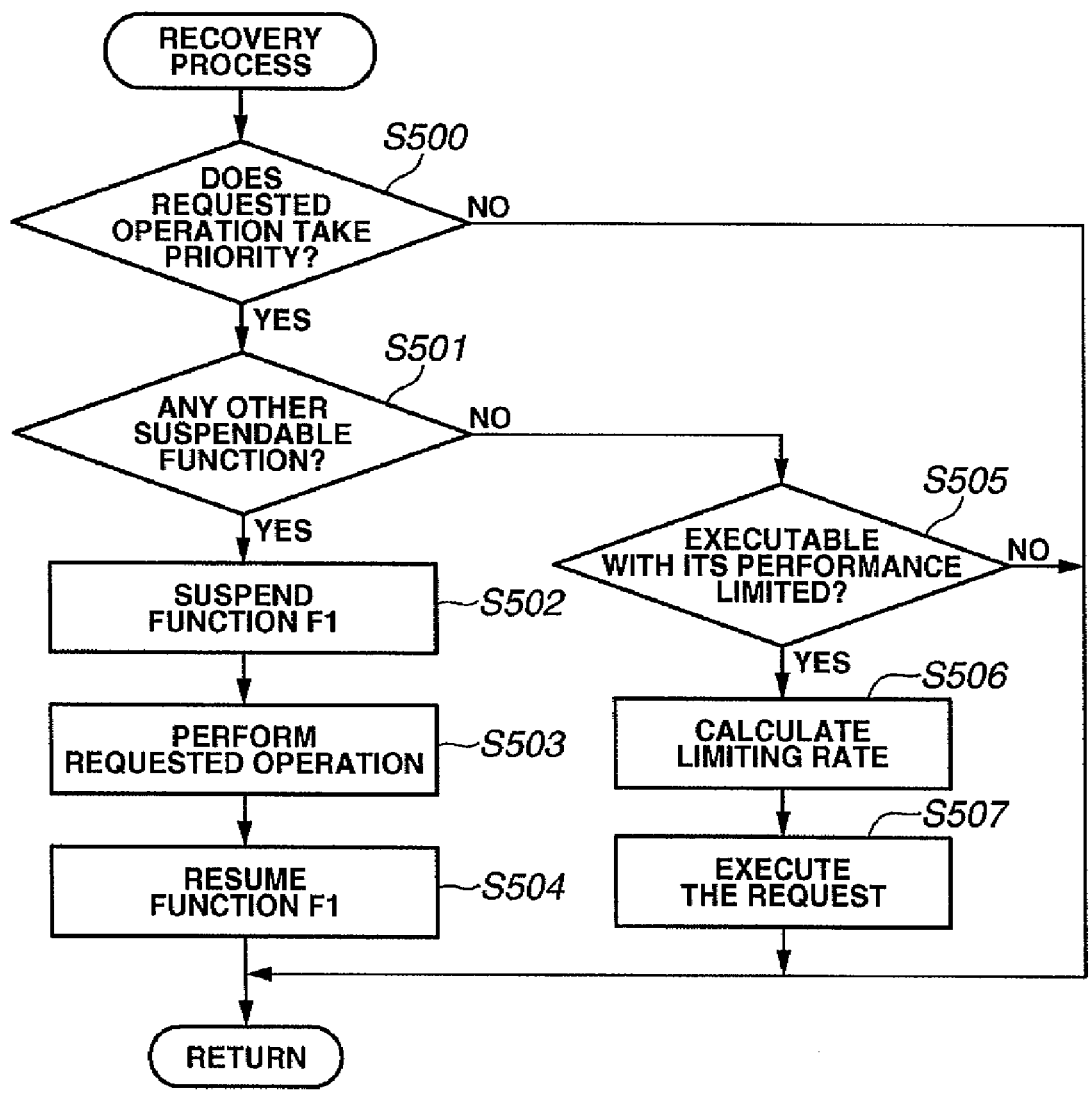
FIG. 6 is a flowchart showing the details of a recovery process in the flowchart in FIG. 5.

The recovery process is described below with reference to a flowchart of FIG. 6.

In step S500, the camera control circuit 6 checks priority of the requested operation that has been refused.

If the requested operation takes priority, in step S501, the camera control circuit 6 determines whether there is any other function that can be temporarily suspended among the functions that are currently operating.

If there is a function F1 which is temporarily suspendable, in step S502, the camera control circuit 6 temporarily suspends the function F1.

In step S503, the camera control circuit 6 executes the requested operation. After the requested operation is completed, in step S504, the camera control circuit 6 resumes the suspended function F1.

If, in step S501, there is not any suspendable function, in step S505, the camera control circuit 6 determines whether the requested operation can be executed with its performance limited. If the operation can be executed with its performance limited, in step S506, the camera control circuit 6 calculates a limiting rate based on "limiting rate" versus "power consumption" information stored in the functional power consumption storage unit 8.

In step S507, the camera control circuit 6 executes the requested operation to which the calculated limiting rate has been applied.

As described, adequate camera control is performed based on power consumption information corresponding to each function stored in the functional power consumption storage unit 8 and maximum power information about a power supply system notified from the maximum power detecting unit 9. Accordingly, the camera performance can be maximized within the limits of a power supply condition.

Third Embodiment

Figure 7:
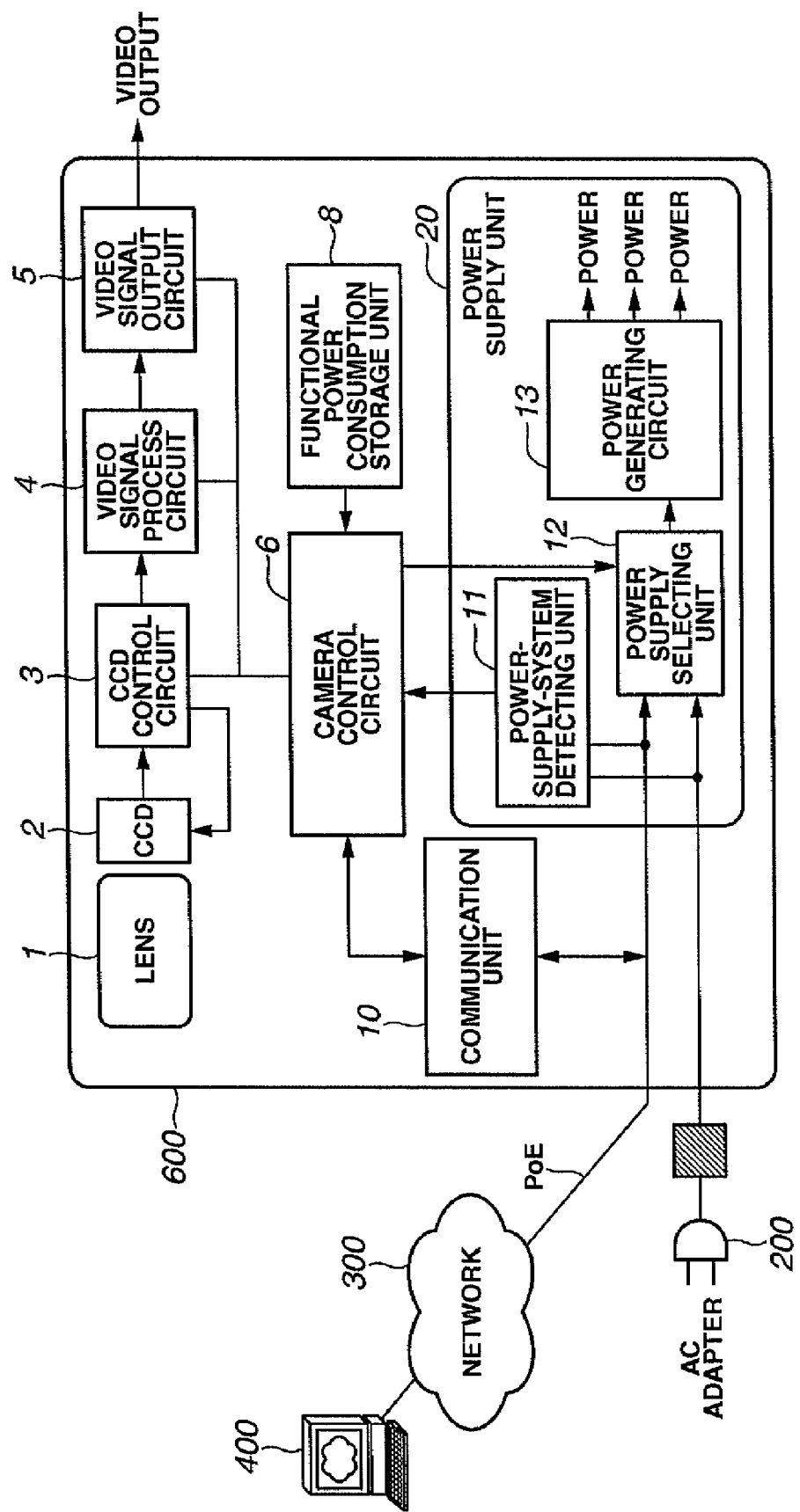
FIG. 7 is a block diagram schematically showing a configuration of an imaging apparatus according to a third embodiment of the present invention.

FIG. 7 is a block diagram schematically showing a configuration of an imaging apparatus (camera) 600 according to a third embodiment of the present invention.

The camera 600 in FIG. 7 includes a communication unit 10 configured to communicate with an external control device 400 instead of the maximum power detecting unit 9 included in the camera 500 shown in FIG. 4 in the second embodiment. In FIG. 7, elements similar to those shown in FIGS. 1 and 4 are designated by the same reference numerals as in FIGS. 1 and 4.

In FIG. 7, the communication unit 10 exchanges information between the camera 600 and the external control device 400. The external control device 400 transmits cameral control information and camera video information and supplies power to drive the camera 600 through a network or information communication cable 300. The functional power consumption storage unit 8 stores therein power consumption information corresponding to each function indicating power consumption of each function of the camera 600. The functional power consumption storage unit 8 extracts power consumption information corresponding to each function stored therein in response to a request from the camera control circuit 6 and, if necessary, transmits the power consumption information corresponding to each function to the external control device 400 via the communication unit 10.

The camera 600 in FIG. 7, without the maximum power detecting unit 9 provided in the second embodiment in FIG. 4, can supply the external control device 400 with information about available power of the power supply system II. The external control device 400 can control the camera operation based on this available power information.

According to the configuration described above, the external control device 400 adequately performs camera control based on the power consumption information corresponding to each function stored in the functional power consumption storage unit 8 and obtained from the camera 600 via the communication unit 10 and maximum power information of the power supply system.

Figure 8:
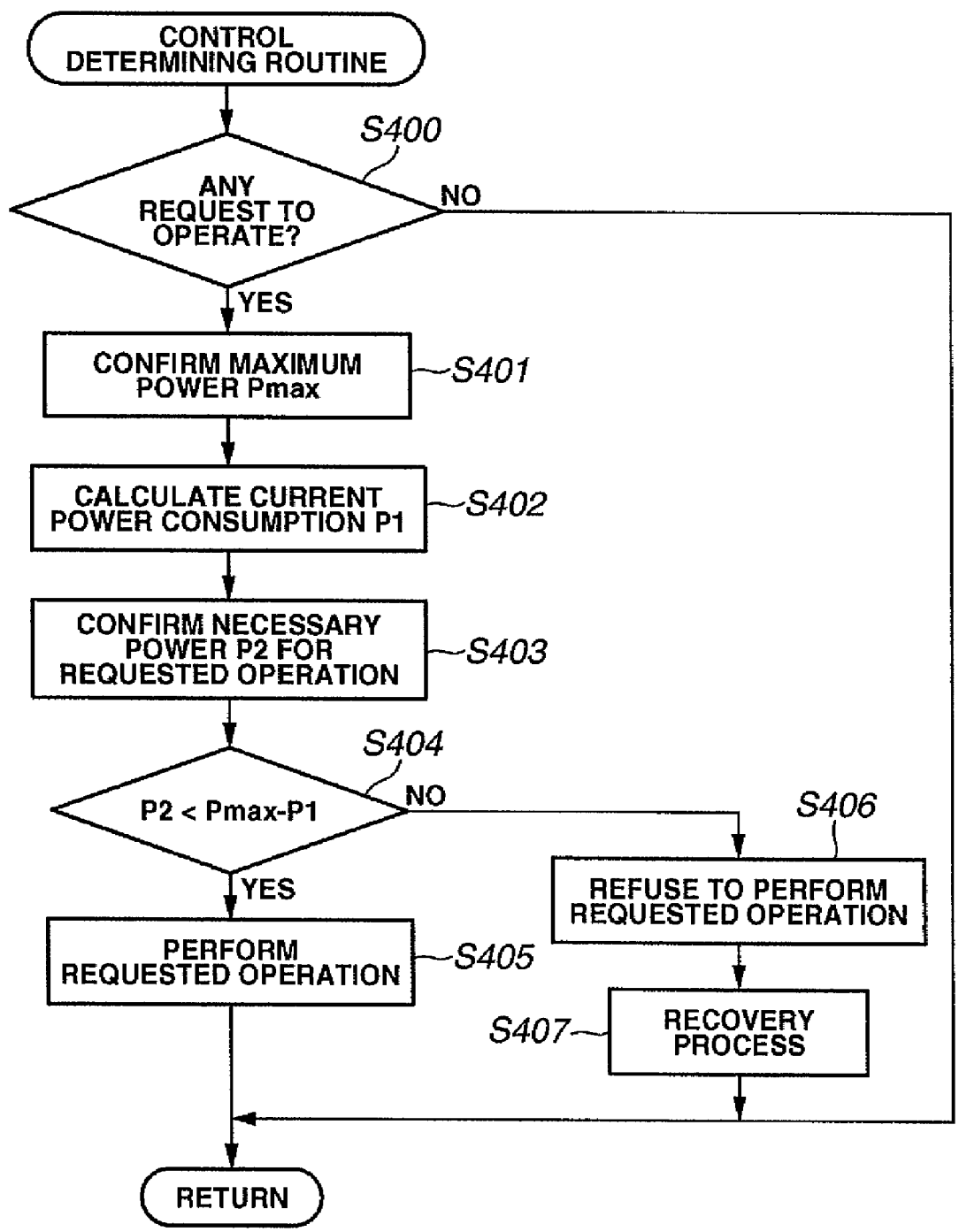
FIG. 8 is a flowchart showing a process of controlling an operation of the imaging apparatus shown in FIG. 7.

Referring to the flowchart of FIG. 8, processes by the external control device 400 based on the power consumption information corresponding to each function obtained from the camera 600 via the communication unit 10 and maximum power information of the power supply system are described below.

In step S400, the external control device 400 determines whether a camera operation request has been generated.

If a camera operation request is generated, in step S401, the external control device 400 confirms maximum power Pmax obtainable from maximum power information.

In step S402, the external control device 400 calculates current power consumption P1 by integrating the power consumption information corresponding to each function obtained from the camera 600 via the communication unit 10.

In step S403, the external control device 400 similarly calculates power P2 required to execute the function requested by the camera operation request based on the power consumption information corresponding to each function.

In step S404, the external control device 400 determines whether the power P2 required to execute the function requested by the camera operation request is smaller than the current surplus power (Pmax−P1) which is usable within such a range that the camera's total power consumption does not exceed the maximum power Pmax. If the power P2 is smaller than the current surplus power (Pmax−P1), in step S405, the external control device 400 executes an operation requested by the camera operation request (requested operation). On the other hand, if the power P2 is not smaller than the current surplus power (Pmax−P1), in step S406, the external control device 400 refuses to perform the requested operation.

In step S407, the external control device 400 performs a recovery process for the requested operation. This recovery process is executed according to the flowchart of the recovery process in FIG. 6 in the same manner as has been described in the second embodiment.

Figure 9:
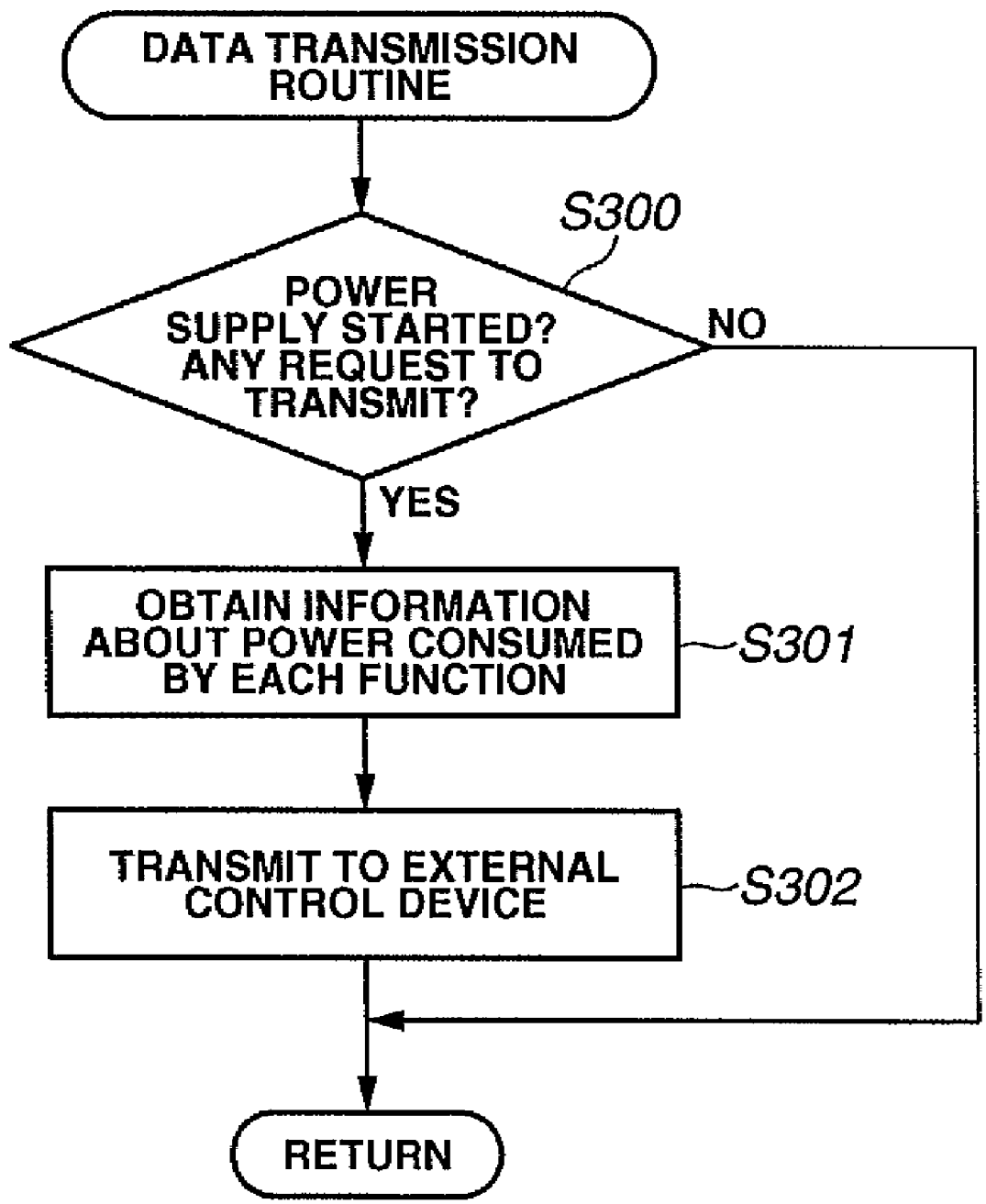
FIG. 9 is a flowchart showing a transmission process from a camera to an external control device.

In addition, referring to FIG. 9, a transmission process for the power consumption information corresponding to each function, which the external control device 400 obtains from the camera 600 via the communication unit 10, is described below.

In step S300, the external control device 400 and the camera control circuit 6 confirm conditions for starting transmission. Transmission of information is executed in response to an occurrence of an event at the camera 600 after the passage of a predetermined period of time since the power supply is started or in response to a transmission request which the camera control circuit 6 receives from the external control device 400.

If information transmission conditions are established, in step S301, the camera control circuit 6 obtains the power consumption information corresponding to each function from the functional power consumption storage unit 8.

In step S302, the camera control circuit 6 transmits the power consumption information corresponding to each function to the external control device 400 via the communication unit 10.

As has been described, the external control device 400 performs adequate camera control based on the power consumption information corresponding to each function stored in the functional power consumption storage unit 8 and obtained from the camera 600 via the communication unit 10 and maximum power information of the power supply system.

Accordingly, the camera performance can be maximized within the limits of a power supply condition.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
    an imaging unit, including an imaging optical system, configured to convert an object image formed by the imaging optical system into an electrical signal;
    a power supply unit capable of being supplied with power from a plurality of power supply systems;
    a maximum power detecting unit configured to detect information about maximum power that can be supplied from a power supply system;
    a power consumption information storage unit configured to store power consumption information indicating power consumption of given functions of the imaging apparatus; and
    a control unit configured to control an operation of the imaging apparatus,
    wherein, based on the power consumption information corresponding to the functions stored in the power consumption information storage unit, the control unit controls the imaging apparatus to select functions to be executed contemporaneously within such a range that power consumption of the imaging apparatus does not exceed the maximum power detected by the maximum power detecting unit.

2. The imaging apparatus according to claim 1, wherein one of the plurality of power supply systems includes Power over Ethernet (PoE).

3. The imaging apparatus according to claim 1, wherein the given functions include at least one of a zoom function, a focus function, a panning function, and a tilting function.

4. An imaging apparatus comprising:
    an imaging unit, including an imaging optical system, configured to convert an object image formed by the imaging optical system into an electrical signal;
    a power supply unit capable of being supplied with power from first and second power supply system to the imaging apparatus;
    a maximum power detecting unit configured to detect information about maximum power that can be supplied from a power supply system;
    an information communication unit configured to communicate information with an external control device;
    a power consumption information storage unit configured to store power consumption information indicating power consumption of given functions of the imaging apparatus; and
    a control unit configured to control a plurality of functions of the imaging apparatus,
    wherein, based on the information about maximum power that can be supplied from a power supply system received from the external control device and the power consumption information stored in the power consumption information storage unit, the control unit controls the imaging apparatus to select functions to be executed contemporaneously within such a range that power consumption of the imaging apparatus does not exceed the maximum power detected by the maximum power detecting unit.

5. The imaging apparatus according to claim 4, wherein the control unit notifies the power consumption information corresponding to each function to the external control device via the information communication unit.

6. The imaging apparatus according to claim 5, wherein the power consumption information corresponding to each function is transmitted to the external control device when power supply is started.

7. The imaging apparatus according to claim 5, wherein the power consumption information corresponding to each function is transmitted to the external control device in response to a transmission request from the external control device.

8. The imaging apparatus according to claim 4, wherein one of the first and second power supply systems includes Power over Ethernet (PoE).

* * * * *